United States Patent
Uphus

(10) Patent No.: US 7,607,818 B2
(45) Date of Patent: Oct. 27, 2009

(54) EXTRUDER WITH GEAR PUMP

(75) Inventor: Reinhard Uphus, Hannover (DE)

(73) Assignee: VMI-AZ Extrusion GmbH (DE)

( * ) Notice: Subject to any disclaimer, the term of this patent is extended or adjusted under 35 U.S.C. 154(b) by 0 days.

(21) Appl. No.: 12/032,863

(22) Filed: Feb. 18, 2008

(65) Prior Publication Data

US 2008/0198687 A1 Aug. 21, 2008

(30) Foreign Application Priority Data

Feb. 16, 2007 (DE) .................. 10 2007 007 824

(51) Int. Cl.
*B29C 47/64* (2006.01)
(52) U.S. Cl. .......................... 366/77; 366/83
(58) Field of Classification Search .............. 366/77, 366/79–85, 272, 301, 318–324; 425/204, 425/208, 209; 418/191–206.1
See application file for complete search history.

(56) References Cited

U.S. PATENT DOCUMENTS

| | | | | | |
|---|---|---|---|---|---|
| 2,692,405 | A | * | 10/1954 | Gayler | 425/379.1 |
| 2,767,437 | A | * | 10/1956 | Marshall | 264/211.11 |
| 4,730,935 | A | * | 3/1988 | Kolossow | 366/82 |
| 5,153,009 | A | * | 10/1992 | Voigt | 425/204 |
| 5,310,256 | A | * | 5/1994 | Boden | 366/77 |
| 6,799,881 | B2 | * | 10/2004 | Fischer | 366/80 |
| 6,974,310 | B2 | * | 12/2005 | Uphus | 417/205 |
| 7,290,923 | B2 | * | 11/2007 | Fischer et al. | 366/77 |
| 7,350,959 | B2 | * | 4/2008 | Uphus | 366/77 |
| 7,354,188 | B2 | * | 4/2008 | Uphus et al. | 366/77 |

FOREIGN PATENT DOCUMENTS

EP 1731764 A1 * 12/2006
JP 2006247917 A * 9/2006

* cited by examiner

*Primary Examiner*—Charles E Cooley
(74) *Attorney, Agent, or Firm*—Robert W. Becker; Robert W. Becker & Assoc.

(57) ABSTRACT

An extruder for viscous masses, and including an extruder screw and a positive-displacement gear pump disposed downstream of the extruder screw as viewed in the conveying direction. The positive-displacement gear pump has at least one conveying gear and at least one positive-displacement gear. The axis of the conveying gear is disposed essentially at right angles to the axis of the extruder screw, and the axis of the positive-displacement gear is disposed essentially in the same direction as the axis of the extruder screw.

18 Claims, 9 Drawing Sheets

EXTRUDER WITH GEAR PUMP

BACKGROUND OF THE INVENTION

The present invention relates to an extruder for viscous masses, in particular thermoplastic melts and natural or synthetic rubber mixtures, and includes an extruder screw which is followed in the conveying direction, downstream, by a positive-displacement gear pump having at least one conveying gear and at least one positive-displacement gear.

In extruders of this type, it is known to arrange a gear pump, generally with two rotors, behind the extruder screw downstream in the conveying direction. The gear pump requires a separate drive and is flanged to the housing of the extruder screw, in which case narrowed portions may occur as a consequence of construction at the transition between the two housings.

The gear pumps are suitable for building high pressure gradients. They operate according to the volumetric conveyance principle in that the tooth cavities form closed-off chambers. Expulsion is virtually independent of the counterpressure and is proportional to the rotational speed. The gear pump dampens and equalizes the pressure pulsations, generated by the screw geometry, up to a factor of 10, thus resulting, in the same ratio, in improved tolerances in terms of weight and of dimension. Moreover, the efficiency of a gear pump is markedly higher, and therefore the mass to be conveyed can have a low temperature.

In known extruder arrangements, the gear pump is designed in the manner of an epicyclic or planetary gearing, the axes of the sun wheel, of the outer ring, of the planet carrier and of all the planet gears being arranged parallel to one another and to the axis of the extruder screw.

Epicyclic gear pumps, however, have the disadvantage that the filling pressure is relatively high due to the feed orifice and flow diversion.

It is therefore an object of the present invention to lower the filling pressure on the gear pump.

SUMMARY OF THE INVENTION

To realize this object, is it proposed according to the invention, that the axis of the conveying gear be arranged essentially at right angles to the axis of the extruder screw and that the axis of the positive-displacement gear be arranged essentially in the same direction as the axis of the extruder screw.

This gives rise to the process engineering advantage that the filling pressure is substantially lower than is the case with the known epicyclic gear pumps, especially since the flow ducts assigned to each planet wheel thereof are dispensed with, the advantage of this being that the screw extruder requires a lower pressure build-up and therefore the viscous masses are heated to a lesser extent.

According to a further feature of the invention, the housing of the gear pump is integrated into the housing of the extruder screw, with the result that the feed orifices are likewise dispensed with, so that even less heat and therefore even less dissipated energy occur.

According to a further feature of the invention, a uniform volume flow can be achieved in that the conveying gear and the positive-displacement gear are designed as bevel gears meshing with one another.

A screw extruder conveys by virtue of internal friction and generates a drag flow along the extruder screw. If, in addition to conveyance, a pressure gradient has to be built up, a pressure volume flow acting in the opposite direction is superposed on the drag volume flow. This leads to increased dissipative heating and to a lowering of the actually conveyable mass flow. By contrast, a positive-displacement gear pump is a volumetric conveyor, and therefore, here, the conveying rate depends on the counterpressure to a substantially lesser extent. The solution according to the invention therefore makes it possible to convey relatively independently of pressure, while a low mass temperature can be achieved by virtue of the positive-displacement gear pump designed according to the invention.

The conveying gear may be designed as a crown gear and the positive-displacement gear as a bevel gear. Alternatively, the positive-displacement gear may be designed as a crown gear and the conveying gear as a bevel gear.

In both instances, expediently, the axis of the positive-displacement gear is arranged at right angles to the axis of the conveying gear.

The conveying behavior of elastomeric masses, such as rubber mixtures, depends greatly on various parameters. If, on account of the prevailing viscosity of the mass, the positive-displacement gear pump conveys to a higher extent than the extruder gear, an underpressure occurs in the transitional region. This may lead to the formation of small bubbles, so that the quality of the conveyed mass does not conform to requirements. In order to rule this out, although the conveying rate of the extruder screw can be increased, this then gives rise, however, for a mixture of, for example, low viscosity, to a corresponding overpressure in the transitional region, which subjects the structure to load and causes the mass temperature to rise more highly than necessary.

For the filling pressure into the pump to be designed optimally in the case of different mixtures, according to a further feature of the invention the positive-displacement gear can have a drive that is independent of the extruder screw.

The solution according to the invention therefore makes it possible by simple means to keep the quality of the extrudate constant, even when different masses, such as, on the one hand, synthetic rubber mixtures and, on the other hand, mixtures of natural rubber, are employed.

If viscous masses only within a relatively limited viscosity range are to be processed and construction is to be simplified, according to a further feature of the invention it is possible for the positive-displacement gear and the extruder screw to be connected frictionally or nonpositively. This avoids the need for a separate drive for the positive-displacement gear and/or the conveying gear.

Alternatively, the conveying gear may have the drive. A higher conveying volume by the positive-displacement gear pump can be achieved in that, on that side of the extruder screw which lies opposite the conveying gear, a further conveying gear is arranged which likewise meshes with the positive-displacement gear. Alternatively, on the periphery of the extruder screw, a plurality of conveying gears may be arranged which are driven by one or more positive-displacement gears.

A further possibility for increasing the conveying volume of the positive-displacement gear pump is that, according to a further feature of the invention, the extruder screw has an extension extending into the region of the conveying gears and also fills the tooth cavities of the positive-displacement gear between two meshing positive-displacement regions out of which the mass flow is led to the extrusion nozzle.

The extension may be led up to the positive-displacement gear and also be connected nonpositively or frictionally to the latter.

There is also the possibility, in a completely closed housing of the positive-displacement gear pump, of driving the positive-displacement gear solely by means of a shaft which extends through the extruder screw within a coaxial bore.

BRIEF DESCRIPTION OF THE DRAWINGS

Exemplary embodiments of the invention are reproduced in the drawing and are explained in more detail by means of the following description. In the drawing.

DESCRIPTION OF SPECIFIC EMBODIMENTS

Figure 1:
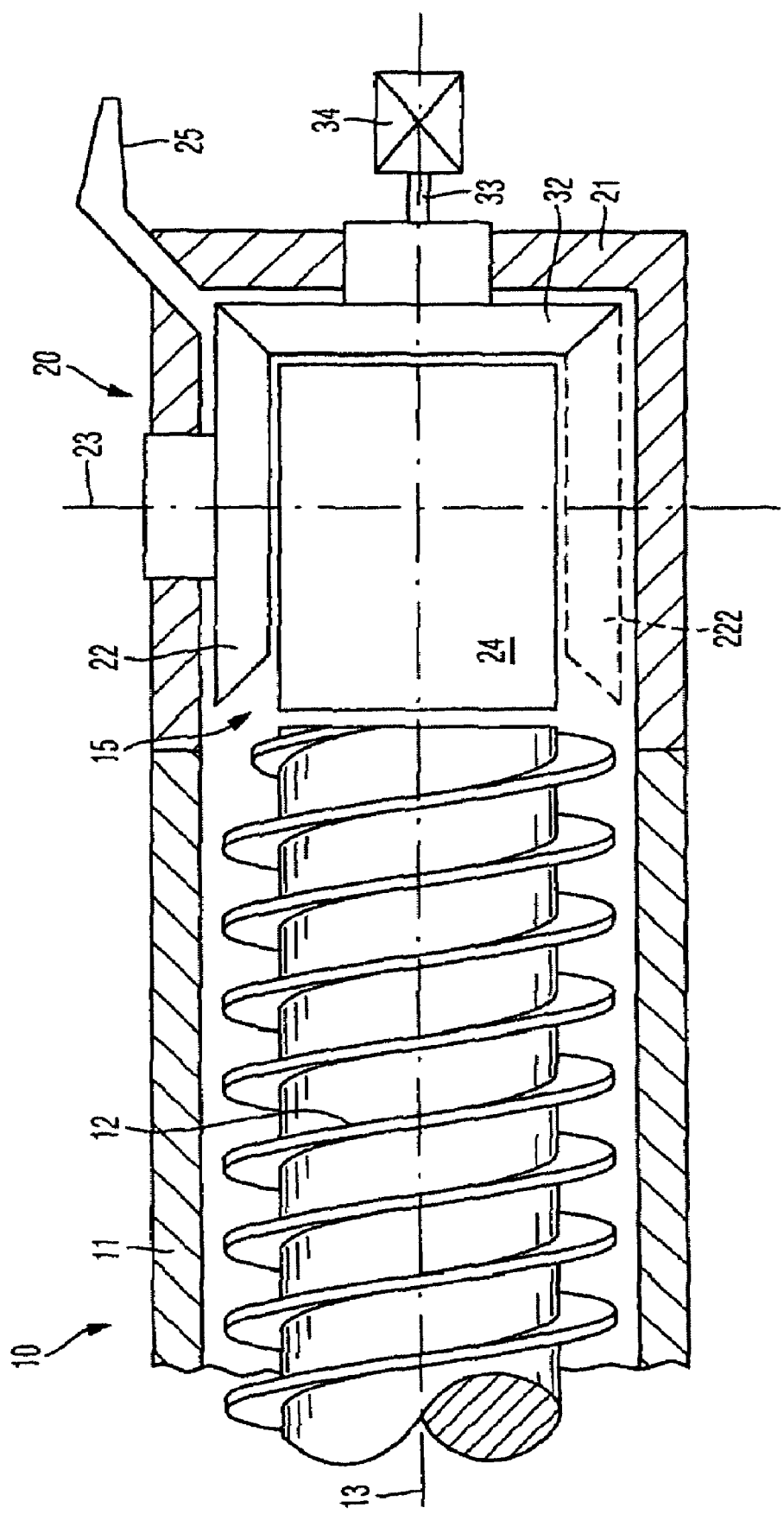
FIG. 1 shows the extruder according to the invention in longitudinal section.

FIG. 1 shows diagrammatically, in longitudinal section, a worm or screw extruder 10 with an extruder housing 11 for receiving an extruder worm or screw 12 of conventional construction.

The extruder housing 11 is followed by a positive-displacement gear pump 20 arranged in a housing 21 which is likewise illustrated only diagrammatically.

Within the housing 21 is arranged a conveying gear 22 which is mounted rotatably about an axis 23.

A positive-displacement gear 32 meshes with the conveying gear 22 and, in the exemplary embodiment illustrated, is arranged coaxially with the axis 13 of the extruder screw 12. In the exemplary embodiment illustrated, the positive-displacement gear 32 is rotatable independent of the screw 12, the axis 33 of the positive-displacement gear 32 being designed as a shaft having a positive-displacement gear drive 34.

In the exemplary embodiment illustrated in FIG. 1, the extruder screw 12 extends as far as an insert 24 within the housing 21 of the positive-displacement gear pump 20.

This gives rise to a transition zone 15 from the screw extruder 10 to the positive-displacement gear pump 20, said transition zone having a relatively large free cross section and allowing the conveying gear 22 to be acted upon uniformly.

Figure 2:
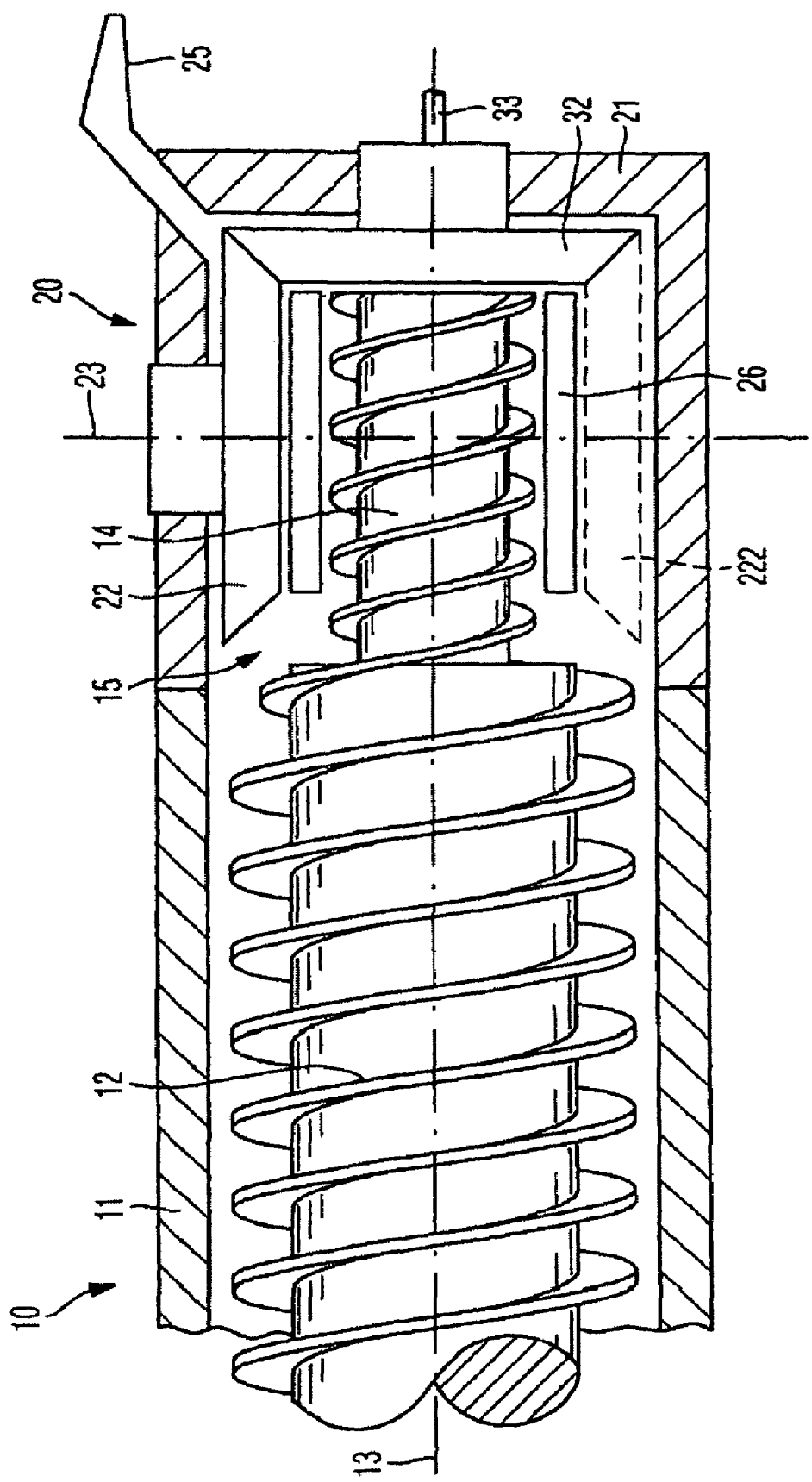
FIG. 2 shows a further exemplary embodiment of the extruder according to the invention in longitudinal section.

According to a preferred embodiment, as indicated for example in FIGS. 1 and 2, the housing 21 of the gear pump 20 is integrated into the housing 11 of the extruder screw 12, with the result that narrowed portions occurring as a consequence of construction at the transition between the two housing portions are avoided.

The axis 23 of the conveying gear 22 is arranged essentially at right angles to the axis 13 of the extruder screw 12. In the exemplary embodiment illustrated in FIG. 1, an exact right angle is provided between the axes 13 and 23.

The viscous mass is fed from the positive-displacement region, in which the conveying gear 22 meshes with the positive-displacement gear 32, to an extrusion nozzle 25.

In the exemplary embodiment illustrated in FIG. 1, a further conveying gear 222 is arranged on that side of the extruder screw 12 which lies opposite the conveying gear 22 and likewise meshes with the positive-displacement gear 32. A plurality of conveying gears 22, 222 which mesh with a positive-displacement gear 32 may be arranged on the circumference of the extruder screw 12. The viscous mass is fed from the respective positive-displacement region, in which the conveying gear 22, 222 meshes with the positive-displacement gear 32, via ducts, not illustrated, inside or outside the housing 21 of the positive-displacement gear pump 20, to the extrusion nozzle 25.

In the exemplary embodiment illustrated in FIG. 2, the extruder screw 12 has an extension 14 extending into the region of the conveying gears 22, 222.

In this exemplary embodiment, the extension 14 of the extruder screw 12 has a reduced cross section and is surrounded by a wall 26 which is provided between the extension 14 and the conveying gear or conveying gears 22, 222 within the housing 21 of the positive-displacement gear pump 20.

The extension 14 may extend up to the positive-displacement gear 32, and the positive-displacement gear 32 may be connected nonpositively to the extruder screw 12 in this region.

In the exemplary embodiments illustrated in FIGS. 1 and 2, there is the possibility of designing the conveying gear or conveying gears 22, 222 as a crown gear and the positive-displacement gear 32 as a bevel gear.

Alternatively, the positive-displacement gear 32 may be designed as a crown gear and the conveying gear or conveying gears 22, 222 as bevel gears. In both instances, the axis of the positive-displacement gear 32 is arranged at right angles to the axis 23 of the conveying gear 22, 222.

The axis 33 of the positive-displacement gear 32 may also be arranged at an acute angle to the axis 23 of the conveying gear 22.

Likewise, the conveying wheel or conveying gears 22, 222 and the positive-displacement gear 32 may be designed as helical gears.

Furthermore, there is the possibility that the positive-displacement gear 32 be designed as a worm and the conveying gear or conveying gears 22, 222 be designed as worm gears.

There is also the possibility of providing at least one of the conveying gears 22, 222 with an independent drive from outside.

In both instances, maintenance work, for example even when the viscous masses are being changed, can be carried out at a lower outlay and more easily than in known gear pumps.

Two extruder screws 12 may also be arranged parallel to one another in the extruder housing 11 and act simultaneously with respective mass flows upon the positive-displacement gear pump 20.

The two extruder screws 12 may also be arranged so as to converge in the direction of the positive-displacement gear pump 20.

Likewise, one or two positive-displacement gear pinions may mesh eccentrically with a conveying crown gear. At least one of these may be driven directly or via an intermediate gearing by the extruder screw or extruder screws.

Figure 3:
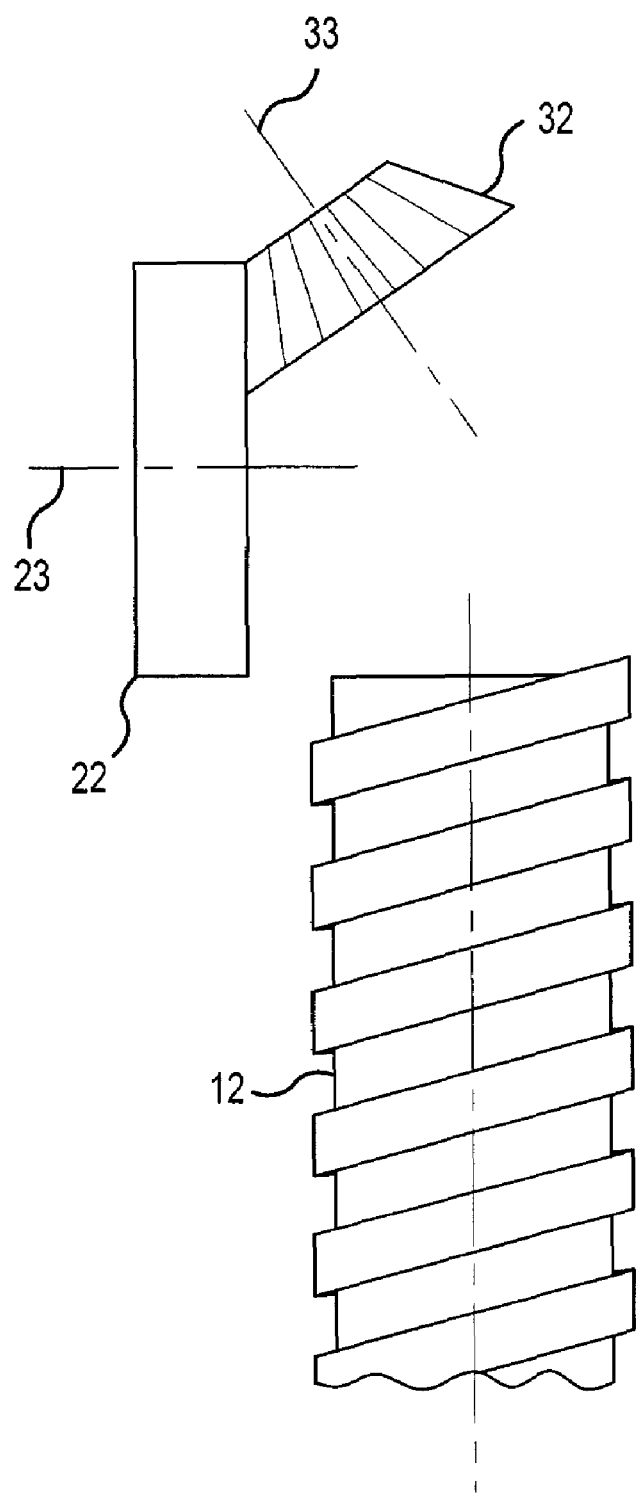
FIG. 3 shows the extruder according to the invention in which the conveying gear is designed as a bevel gear and the positive-displacement gear is embodied as a crown gear and in which the axis of the positive-displacement gear is disposed at an acute angle to the axis of the conveying gear.
Figure 4:
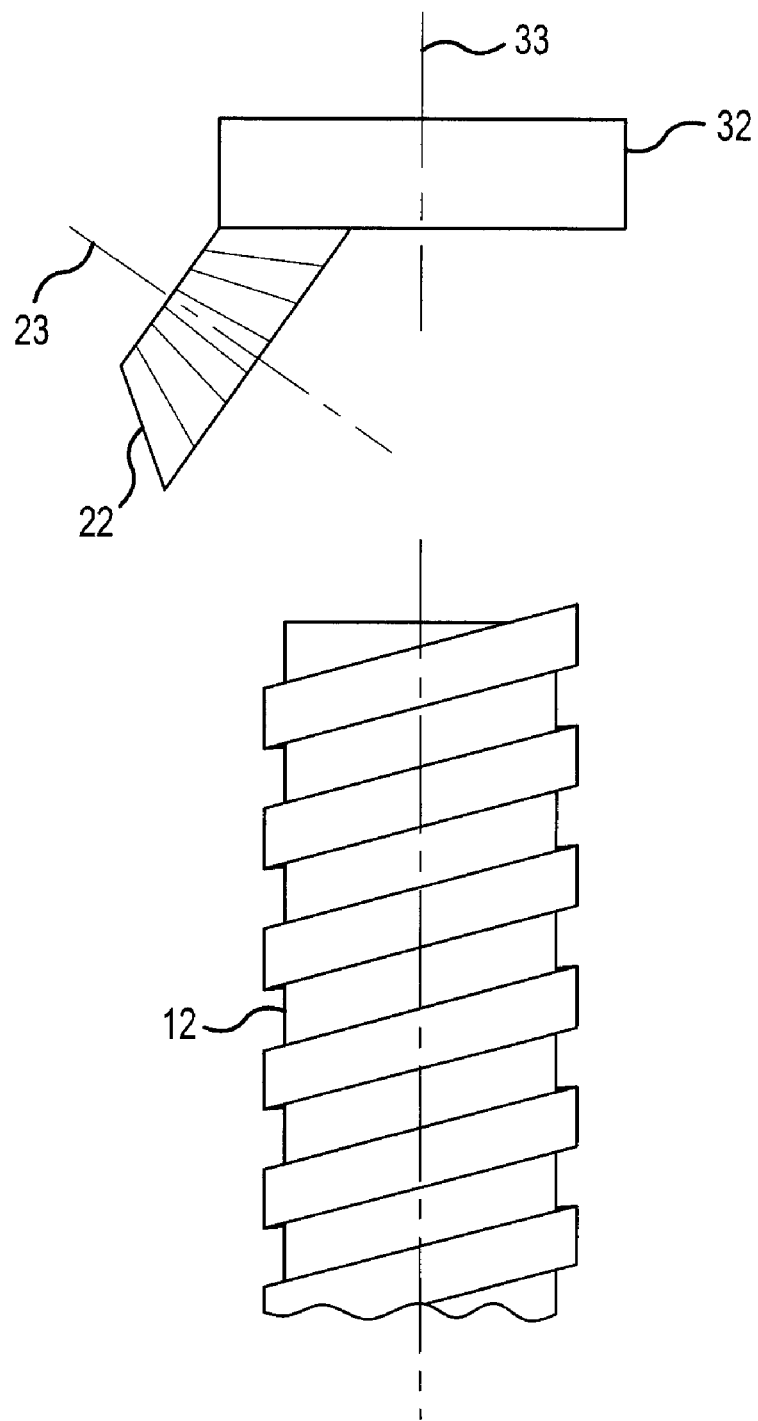
FIG. 4 shows the extruder according to the invention in which the conveying gear is designed as a crown gear and the positive-displacement gear is embodied as a bevel gear.
Figure 5:
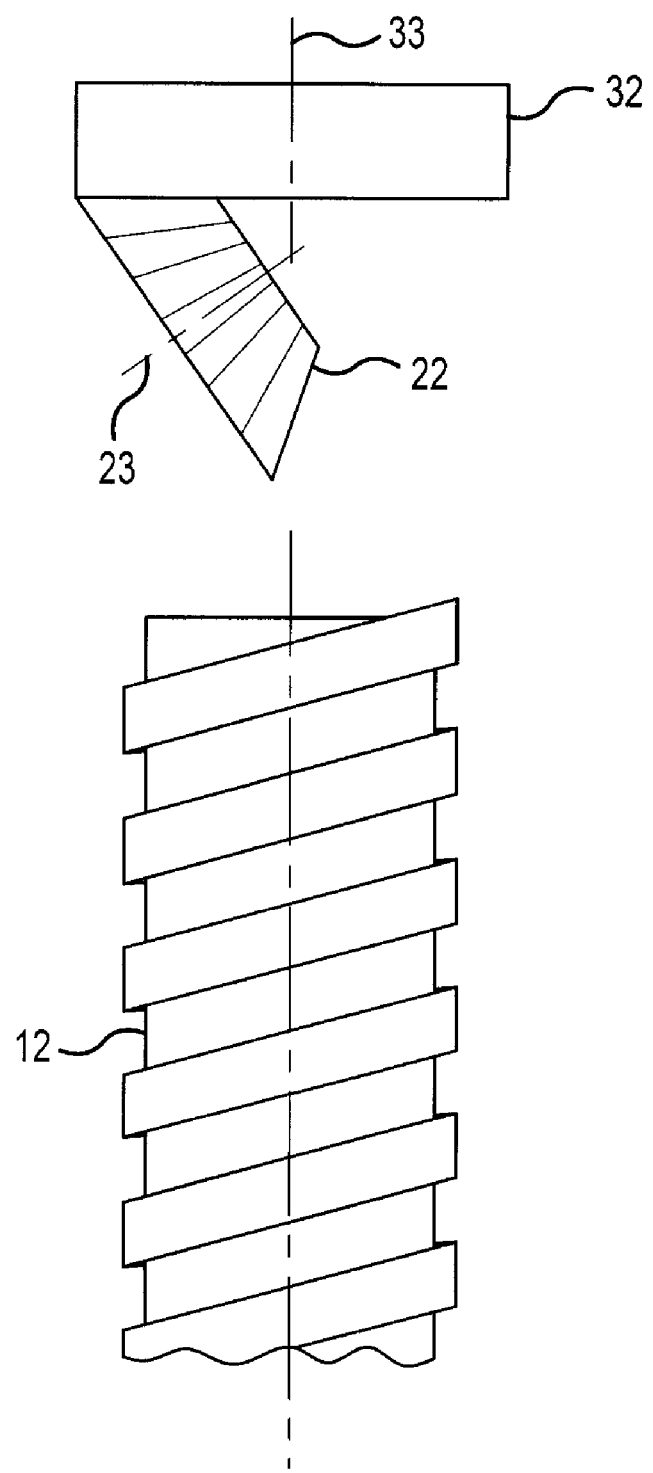
FIG. 5 shows a further embodiment of the extruder in which the axes of the conveying gear and positive-displacement gear form an obtuse angle relative to one another.

FIG. 3 shows the extruder 10 in an embodiment in which the conveying gear 22 is designed as a bevel gear and the positive-displacement gear 32 is embodied as a crown gear and in which the axis 33 of the positive-displacement gear 32 is disposed at an acute angle to the axis 23 of the conveying gear 22. In a further embodiment as shown in FIG. 4, the conveying gear 22 is designed as a crown gear and the positive-displacement gear 32 is embodied as a bevel gear;

FIG. 5 shows a further embodiment in which the axis 23 of the conveying gear 22 and the axis 32 of the positive displacement gear 33 are disposed at an obtuse angle to one another.

Figure 6:
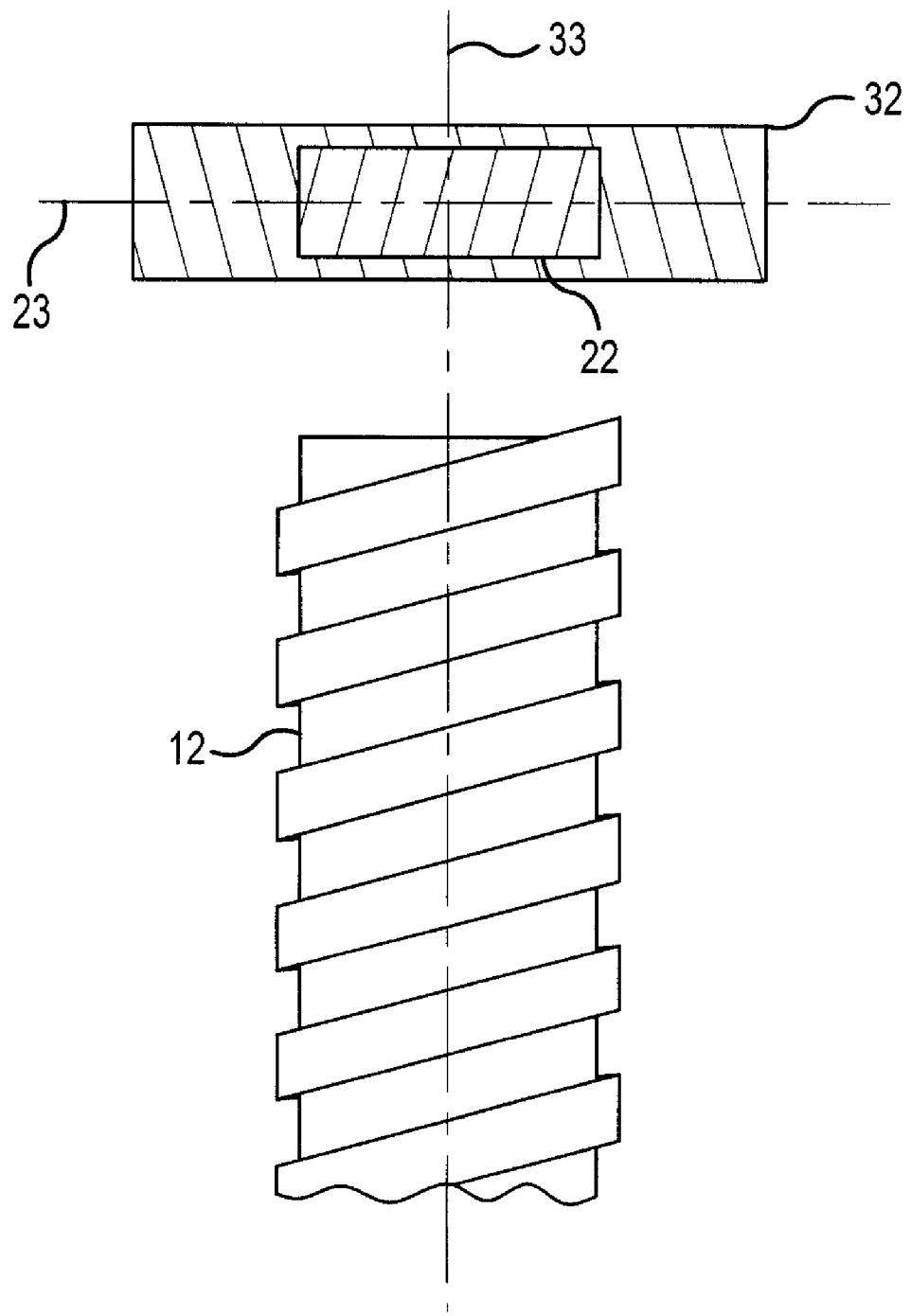
FIG. 6 shows an embodiment of the extruder according to the invention in which the conveying gear and the positive-displacement gear are embodied as helical gears.
Figure 7:
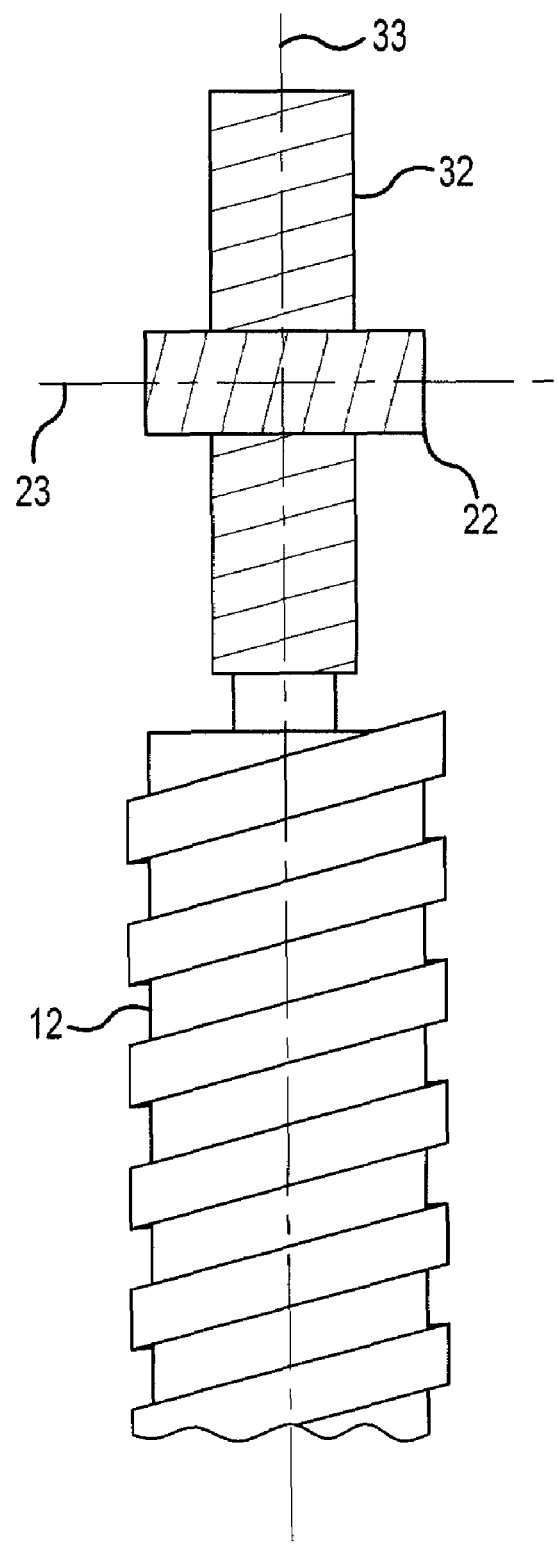
FIG. 7 shows an embodiment of the extruder according to the invention in which the positive-displacement gear is embodied as a screw and the conveying gear as a screw gear, in which the positive-displacement gear is frictionally connected with the extruder screw, and in which an extension of the extruder screw extends to the positive-displacement gear.

A further embodiment is illustrated in FIG. 6, which shows the conveying gear 23 and the positive-displacement gear 33 as helical gears. Alternatively, as shown in FIG. 7, the positive-displacement gear 33 is embodied as a screw and the conveying gear 22 as a screw gear. The positive-displacement gear 33 can be frictionally connected with the extruder screw 12, and in which an extension 14 of the extruder screw 12 extends to the positive-displacement gear 33.

Figure 8:
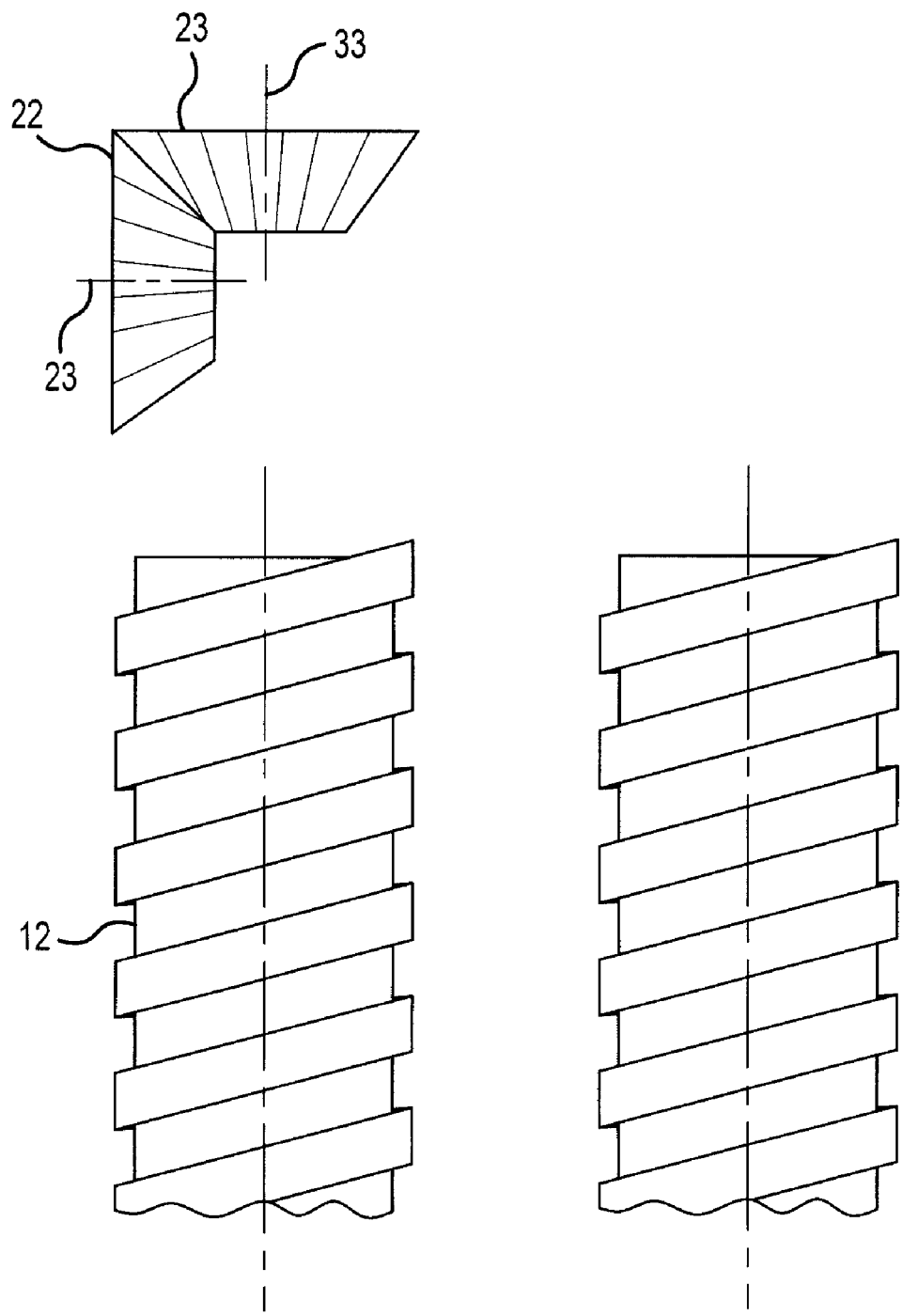
FIG. 8 shows an embodiment of the extruder according to the invention in which two extruder screws are disposed parallel to one another in a housing of the extruder.

As shown in FIG. 8, a further embodiment contemplates that two extruder screws 12 are disposed parallel to one another in a housing of the extruder. The two extruder screws 12 are adapted to simultaneously supply respective mass flows to the positive-displacement gear pump 20.

Figure 9:
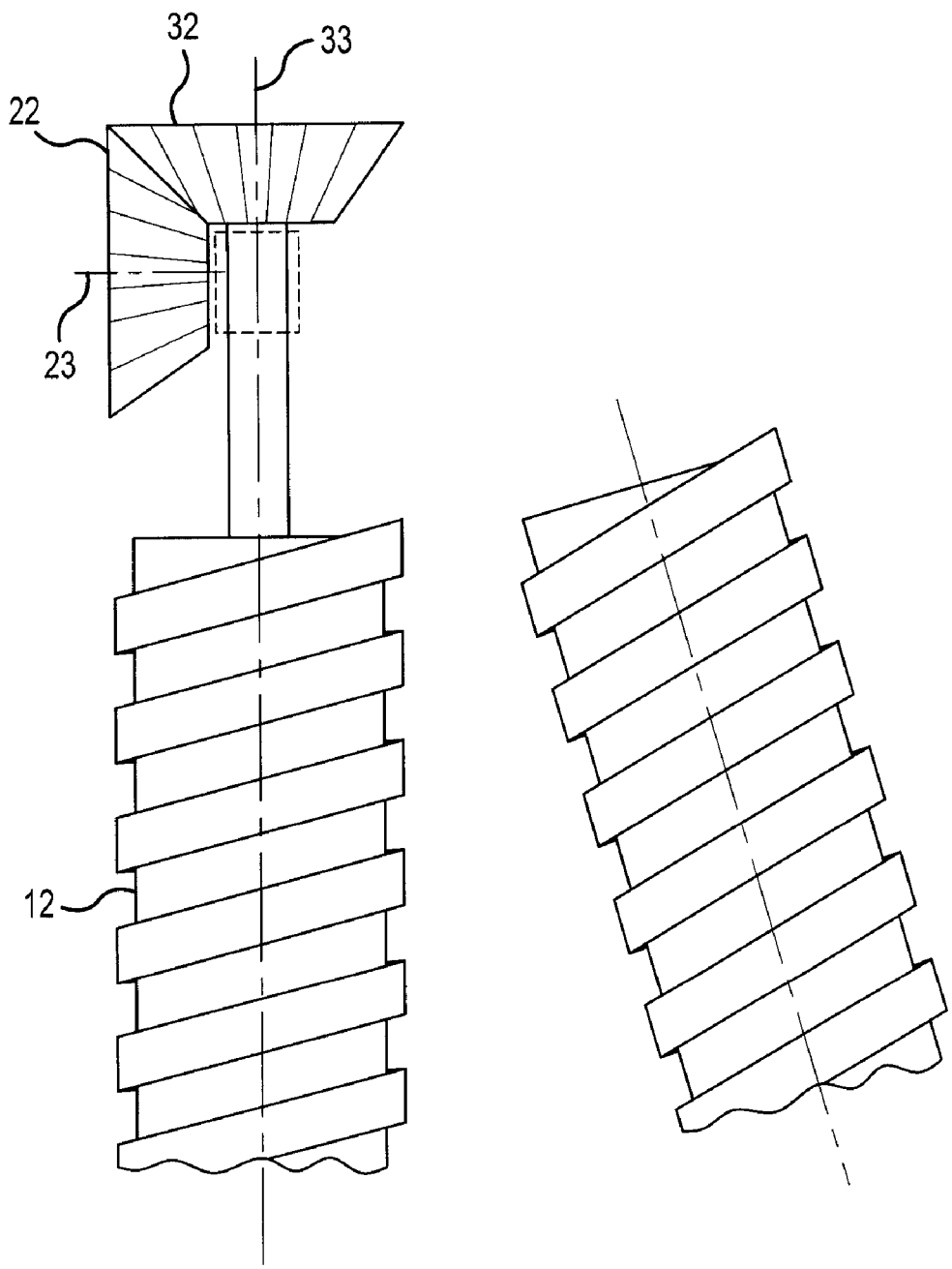
FIG. 9 shows an embodiment of the extruder according to the invention in which two extruder screws are provided that converge in a housing of the extruder in a direction toward the positive-displacement gear pump.

FIG. 9 shows that the two extruder screws 12 can be arranged to converge in a housing 11 of extruder in a direction toward positive-displacement gear pump 20. The two extruder screws 1 are adapted to simultaneously supply respective mass flows to the positive-displacement gear pump 20. One or two positive-displacement gear pinions 40, 41, which mesh with a conveying crown gear 22, are associated eccentrically with said two extruder screws 12. At least one of the positive-displacement gear pinions 40, 41 is adapted to be driven directly or via an intermediate gear by one or both extruder screws 12 and meshes with the conveying crown gear 22.

The specification incorporates by reference the disclosure of German priority document DE 10 2007 007 824.4 filed 16 Feb. 2007.

The present invention is, of course, in no way restricted to the specific disclosure of the specification and drawings, but also encompasses any modifications within the scope of the appended claims.

The invention claimed is:

1. An extruder for viscous masses, comprising:
   an extruder screw (12); and
   a positive-displacement gear pump (20) disposed downstream of said extruder screw (12) as viewed in a conveying direction, wherein said positive-displacement gear pump (20) is provided with at least one conveying gear (22, 222) and at least one positive-displacement gear (32), further wherein an axis (23) of said at least one conveying gear (22, 222) is disposed essentially at right angles to an axis (13) of said extruder screw (12), and wherein an axis (33) of said at least one positive-displacement gear (32) is disposed essentially in the same direction as said axis (13) of said extruder screw (12), wherein said at least one conveying gear (22,222) and said at least one positive-displacement pear (32) are embodied as bevel gears that mesh with one another.

2. An extruder according to claim 1, wherein said at least one conveying gear (22, 222) or said at least one positive-displacement gear (32) is designed as a crown gear and said at least one positive-displacement gear (32) or said at least one conveying gear (22, 222) is embodied as a bevel gear.

3. An extruder according to claim 1 wherein said axis (33) of said at least one positive-displacement gear (32) is disposed at right angles to said axis (23) of said at least one conveying gear (22, 222).

4. An extruder according to claim 1, wherein said axis (33) of said at least one positive-displacement gear (32) is disposed at an acute angle to said axis (23) of said at least one conveying gear (22, 222).

5. An extruder according to claim 1, wherein said at least one conveying gear (22, 222) and said at least one positive-displacement gear (32) are embodied as helical gears.

6. An extruder according to claim 5, wherein said at least one positive-displacement gear (32) is embodied as a screw and said at least one conveying gear (22, 222) as a screw gear.

7. An extruder according to claim 1, wherein said at least one positive-displacement gear (32) and said extruder screw (12) are coaxially disposed.

8. An extruder according to claim 1, wherein said at least one positive-displacement gear (32) is frictionally connected with said extruder screw (12).

9. An extruder according to claim 1, wherein said at least one positive-displacement gear (32) is provided with a drive that is independent of said extruder screw (12).

10. An extruder according to claim 1, wherein a further conveying gear (222) is arranged on a side of said extruder screw (12) that is remote from said at least one conveying gear (22), and wherein said further conveying gear (222) also meshes with said at least one positive-displacement gear (32).

11. An extruder according to claim 1, wherein a plurality of conveying gears (22, 222) are disposed on the periphery of said extruder screw (12).

12. An extruder according to claim 1, wherein said extruder screw (12) is provided with an extension (14) that extends into a region of said at least one conveying gear (22, 222).

13. An extruder according to claim 12, wherein said extension (14) extends to said at least one positive-displacement gear (32).

14. An extruder according to claim 1, wherein two extruder screws (12) are disposed parallel to one another in a housing (11) of said extruder, and wherein said two extruder screws (12) are adapted to simultaneously supply respective mass flows to said positive-displacement gear pump (20).

15. An extruder according to claim 1, wherein two extruder screws (12) are provided that converge in a housing (11) of said extruder in a direction toward said positive-displacement gear pump (20), and wherein said two extruder screws (12) are adapted to simultaneously supply respective mass flows to said positive-displacement gear pump (20).

16. An extruder according to claim 1, wherein two extruder screws (12) are disposed in a housing (11) of said extruder and are adapted to simultaneously supply respective mass flows to said positive-displacement gear pump (20), and wherein one or two positive-displacement gear pinions, which mesh with a conveying crown gear, are associated eccentrically with said two extruder screws (12).

17. An extruder according to claim 16, wherein at least one of said positive-displacement gear pinions is adapted to be driven directly or via an intermediate gear by one or both extruder screws (12) and meshes with said conveying crown gear.

18. An extruder according to claim 1, wherein a housing (21) of said positive-displacement gear pump (20) is integrated into an extruder housing (11) of said extruder.

* * * * *